United States Patent
Lin et al.

(10) Patent No.: US 12,288,282 B2
(45) Date of Patent: Apr. 29, 2025

(54) METHOD AND APPARATUS FOR DISPLAYING FACIAL EXPRESSION IN VIRTUAL SCENE

(71) Applicant: Tencent Technology (Shenzhen) Company Limited, Guangdong (CN)

(72) Inventors: Lin Lin, Guangdong (CN); Haohui Liang, Guangdong (CN); Zixi Liu, Guangdong (CN); Bokai Su, Guangdong (CN); Shanshan Qian, Guangdong (CN); Yiqi Li, Guangdong (CN); Ya Zhang, Guangdong (CN); Yinchao Chen, Guangdong (CN); Han Wen, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 121 days.

(21) Appl. No.: 17/971,882

(22) Filed: Oct. 24, 2022

(65) Prior Publication Data
US 2023/0048502 A1   Feb. 16, 2023

Related U.S. Application Data

(63) Continuation of application No. PCT/CN2022/088267, filed on Apr. 21, 2022.

(30) Foreign Application Priority Data

May 26, 2021   (CN) .......................... 202110580625.X

(51) Int. Cl.
*G06T 13/40*   (2011.01)
*G06F 3/04817*   (2022.01)
(Continued)

(52) U.S. Cl.
CPC .......... *G06T 13/40* (2013.01); *G06F 3/04817* (2013.01); *G06F 3/04883* (2013.01);
(Continued)

(58) Field of Classification Search
CPC ..... G06T 13/40; G06T 19/20; G06T 2200/24; G06F 3/04883; G06F 3/04817;
(Continued)

(56) References Cited

U.S. PATENT DOCUMENTS

| 11,278,810 B1 * | 3/2022 | Sarria, Jr. ............. G06F 3/0482 |
| 2003/0227458 A1 * | 12/2003 | Page .................... G06T 11/206 |
| | | 345/440 |
| 2016/0259526 A1 | 9/2016 | Lee et al. |

FOREIGN PATENT DOCUMENTS

| CN | 107479784 | 12/2017 |
| CN | 111010585 | 4/2020 |
| CN | 111589128 | 8/2020 |
| CN | 112569611 | 3/2021 |

(Continued)

OTHER PUBLICATIONS

International Search Report issued Jun. 29, 2022 in International (PCT) Application No. PCT/CN2022/088267.
(Continued)

*Primary Examiner* — Weiming He
(74) *Attorney, Agent, or Firm* — Crowell & Moring LLP

(57) ABSTRACT

This disclosure is directed to a method and apparatus for displaying an expression in a virtual scene. The method includes: displaying a virtual scene; displaying an expression selection region at a first target position in the virtual scene in response to a drag operation on an expression addition icon; and displaying the first target expression in the virtual scene in response to a selection operation on a first target expression in a plurality of first candidate expressions.

19 Claims, 11 Drawing Sheets

(51) Int. Cl.
*G06F 3/04883* (2022.01)
*G06T 19/20* (2011.01)
*G06V 10/25* (2022.01)

(52) U.S. Cl.
CPC ............. *G06T 19/20* (2013.01); *G06V 10/25* (2022.01); *G06T 2219/2004* (2013.01)

(58) Field of Classification Search
CPC ............ G06F 3/04842; G06F 3/04845; G06F 3/0482; G06F 3/0483; A63F 13/52; A63F 13/87; A63F 2300/5553
See application file for complete search history.

(56) References Cited

FOREIGN PATENT DOCUMENTS

| | | |
|---|---|---|
| CN | 112774184 A | 5/2021 |
| CN | 113144601 | 7/2021 |
| JP | 2011-141632 A | 7/2011 |
| JP | 2021-535656 | 12/2021 |
| WO | WO 2020/125292 A1 | 6/2020 |

OTHER PUBLICATIONS

Chinese Office Action with English translation, Oct. 25, 2022, pp. 1-11, issued in Chinese Application No. 202110580625.X.
Japanese Office Action with English translation, Jul. 26, 2024, pp. 1-12, issued in Japanese Patent Application No. 2023-538694.
Baidu Experience, How to show emoticons in League of Legends, retrieved online Aug. 15, 2024, pp. 1-6.

* cited by examiner

METHOD AND APPARATUS FOR DISPLAYING FACIAL EXPRESSION IN VIRTUAL SCENE

RELATED APPLICATION

This application is a continuation application of PCT Patent Application No. PCT/CN2022/088267, filed on Apr. 21, 2022, which claims priority to Chinese Patent Application No. 202110580625.X, filed on May 26, 2021 and entitled "METHOD AND APPARATUS FOR DISPLAYING EXPRESSION IN VIRTUAL SCENE, DEVICE, AND MEDIUM", wherein the content of the of the above-referenced applications is incorporated herein by reference in its entirety.

FIELD OF THE TECHNOLOGY

This disclosure relates to the field of computer technologies, and in particular, to a method and apparatus for displaying an expression in a virtual scene, a device, and a medium.

BACKGROUND OF THE DISCLOSURE

With the development of the multimedia technology, an increasing number of types of games can be played. The auto chess game is a relatively popular game. During the game, different virtual objects can battle with each other in a virtual scene.

SUMMARY

Embodiments of this disclosure provide a method and apparatus for displaying an expression in a virtual scene, a device, and a medium. The technical solutions are as follows:

According to an aspect, a method for displaying an expression in a virtual scene is provided, the method including:
  displaying a virtual scene, an expression addition icon being displayed in the virtual scene, the expression addition icon being for adding an expression in the virtual scene;
  displaying an expression selection region at a first target position in the virtual scene in response to a drag operation on the expression addition icon, the first target position being a position at which the drag operation ends, and a plurality of first candidate expressions being displayed in the expression selection region; and
  displaying, in response to a selection operation on a first target expression in the plurality of first candidate expressions, the first target expression in the virtual scene.

According to an aspect, a method for displaying an expression in a virtual scene is provided, the method including:
  displaying a virtual scene, an expression addition icon being displayed in the virtual scene, the expression addition icon being for adding an expression in the virtual scene;
  displaying an expression selection region in the virtual scene in response to a click operation on the expression addition icon, a plurality of first candidate expressions being displayed in the expression selection region; and
  displaying, in response to a drag operation on a second target expression in the plurality of first candidate expressions, the second target expression at a second target position, the second target position being a position at which the drag operation ends.

According to an aspect, an apparatus for displaying an expression in a virtual scene is provided, the apparatus including a memory operable to store computer-readable instructions and a processor circuitry operable to read the computer-readable instructions. When executing the computer-readable instructions, the processor circuitry is configured to:
  display a virtual scene, an expression addition icon being displayed in the virtual scene, the expression addition icon being for adding an expression in the virtual scene;
  display an expression selection region at a first target position in the virtual scene in response to a drag operation on the expression addition icon, the first target position being a position at which the drag operation ends, and a plurality of first candidate expressions being displayed in the expression selection region; and
  display, in response to a selection operation on a first target expression in the plurality of first candidate expressions, the first target expression in the virtual scene.

According to an aspect, a computer device is provided, the computer device including one or more processors and one or more memories, the one or more memories storing at least one computer program, the computer program being loaded and executed by the one or more processors to implement the method for displaying an expression in a virtual scene.

According to an aspect, a computer-readable storage medium is provided, the computer-readable storage medium storing at least one computer program, the computer program being loaded and executed by a processor to implement the method for displaying an expression in a virtual scene.

According to an aspect, a computer program product or computer program is provided, the computer program product or computer program including program code, the program code being stored in a computer-readable storage medium. A processor of a computer device reads the program code from the computer-readable storage medium and executes the program code to cause the computer device to perform the method for displaying an expression in a virtual scene described above.

By using the technical solutions provided in the embodiments of this disclosure, a user can trigger display of an expression selection region by dragging an expression addition icon, so that expression selection can be performed based on the expression selection region, and therefore, a selected first target expression is displayed at a first target position in a virtual scene. Because the first target position is a position at which the drag operation ends, a display position of the first target expression can be changed by adjusting the drag operation. The operations are simple and convenient, and the man-machine interaction efficiency is high. For example, when the user intends to send an expression in the virtual scene, by performing a drag operation on the expression addition icon and then selecting, in the displayed expression selection region, the first target expression that the user intends to display, the expression can be sent. Compared with the manner of first calling up a chat window, calling an expression selection panel in the chat window, selecting an expression in the expression selection panel, and then clicking a send control in the chat window to send the expression, the operations are simple and convenient, and the man-machine interaction efficiency is improved.

DESCRIPTION OF EMBODIMENTS

To make objectives, technical solutions, and advantages of this disclosure clearer, the following further describes implementations of this disclosure in detail with reference to the accompanying drawings.

The terms "first", "second", and the like in this disclosure are used for distinguishing between same items or similar items of which effects and functions are basically the same. The "first", "second", and "$n^{th}$" do not have a dependency relationship in logic or time sequence, and a quantity and an execution order thereof are not limited.

In this disclosure, the term "at least one" means one or more and the term "a plurality of" means two or more. For example, a plurality of subregions means two or more subregions.

In the related art, if a user intends to send an expression when playing an auto chess game, the user needs to call up a chat window in the auto chess game, call an expression selection panel in the chat window, select an expression in the expression selection panel, and then click a send control in the chat window to send the expression.

In this case, steps for the user to send the expression are relatively cumbersome, resulting in relatively low man-machine interaction efficiency.

First, terms involved in the embodiments of this disclosure are introduced:

Auto chess: It is a new type of multiplayer battle strategy game, in which users develop their own chess pieces as well as a lineup of the chess pieces to fight against the opponent's lineup. During a battle, for losers of the battle, virtual hit points are deducted, and the ranking is decided according to the elimination order.

Chess pieces: They are different combat units, and users can perform operations such as equipping, upgrading, purchasing, and selling on the chess pieces. Most of the chess pieces are acquired by refreshing the chess piece pool, and a small part comes from 'drafts' and battle activities.

Traits: They refer to different classifications of chess pieces (there are generally two traits: occupation and race). When a certain quantity of chess pieces with the same trait are located in a combat zone, the special capability of the trait can be activated, providing the chess pieces with stronger combat power.

Purchase and sell: Users can obtain chess pieces by consuming virtual resources, and users can obtain virtual resources by selling chess pieces (there will be a certain discount).

Figure 1:
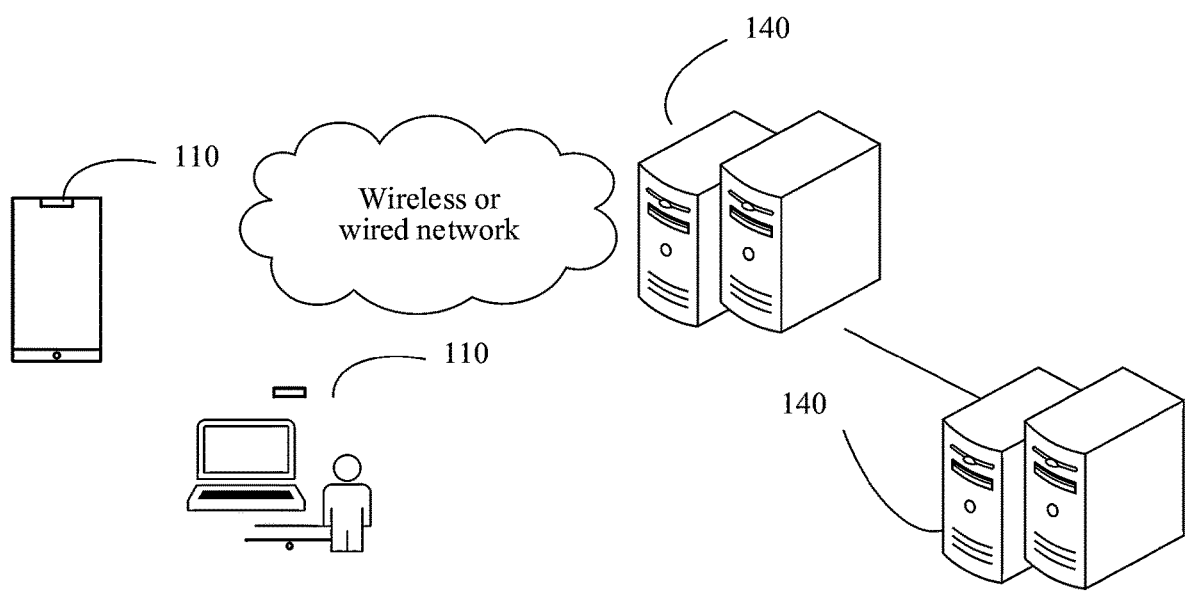
FIG. 1 is a schematic diagram of an implementation environment of a method for displaying an expression in a virtual scene according to an embodiment of this disclosure.

FIG. 1 is a schematic diagram of an implementation environment a method for displaying an expression in a virtual scene according to an embodiment of this disclosure. Referring to FIG. 1, the implementation environment includes a terminal 110 and a server 140.

The terminal 110 is connected to the server 140 through a wireless network or a wired network. In an exemplary implementation, the terminal 110 is a smartphone, a tablet computer, a notebook computer, a desktop computer, or the like, but is not limited thereto. An application supporting virtual scene display is installed and run on the terminal 110.

In an exemplary implementation, the server 140 is an independent physical server, or is a server cluster or a distributed system formed by a plurality of physical servers, or is a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence (AI) platform.

In an exemplary implementation, the terminal 110 generally refers to one of a plurality of terminals. In the embodiments of this disclosure, the terminal 110 is merely used as an example for description.

A person skilled in the art may learn that there may be more or fewer terminals. For example, there may be only one terminal, or there may be dozens of or hundreds of or more terminals. In this case, another terminal may be further included in the foregoing implementation environment. The quantity and the device type of the terminals are not limited in the embodiments of this disclosure.

After the implementation environment in the embodiments of this disclosure is described, an application scenario in the embodiments of this disclosure is described below.

Technical solutions provided in the embodiments of this disclosure can be applied to a scenario of an auto chess game. In an exemplary implementation, in the auto chess game, virtual objects are also chess pieces, and classification icons are also trait icons. In order to describe the technical solutions provided in the embodiments of this disclosure more clearly, some contents related to the auto chess game are described below:

The auto chess game is a turn-based game. The battle process of the game is divided into a plurality of rounds. Users can upgrade chess pieces and adjust positions of the chess pieces during the interval of the rounds. Battles are divided into battles between different users and battles between a user and a non-player-controlled character (NPC). In each round, the winning user can obtain a relatively large quantity of virtual resources, and the losing user can only obtain a relatively small quantity of virtual resources. In an exemplary implementation, the virtual resources are gold coins in the game. In addition, a certain quantity of virtual hit points will be deducted for the losing user, and when the virtual hit points of any user drops to 0, the user will be eliminated.

In some embodiments, users who win consecutively can obtain a winning streak reward, that is, users who win consecutively can obtain additional virtual resources as a reward. Certainly, to balance the game, users who lose consecutively can also obtain a winning streak reward. In a battle round between a user and an NPC, the user can obtain virtual equipment by defeating the NPC, and the virtual equipment can improve attributes of chess pieces, thereby improving the combat power of the chess pieces.

Chess pieces in the auto chess game vary in quality, which is usually described by using star ratings. In some embodiments, the chess pieces are usually divided into three star ratings. For the same chess piece, the combat power of a 3-star chess piece is stronger than that of a 2-star chess piece, and the combat power of a 2-star chess piece is stronger than that of a 1-star chess piece. A chess piece star rating increasing process is also a process for the user to improve the combat power thereof. In an exemplary implementation, chess pieces initially obtained by users are all 1-star chess pieces, and as the game progresses, the users can increase the star ratings of the chess pieces. In some embodiments, three identical 1-star chess pieces can be combined into one 2-star chess piece, and three identical 2-star chess pieces can be combined into one 3-star chess piece. The user can purchase chess pieces through the store, that is, the user consumes a certain quantity of virtual resources in the store in exchange for a chess piece. In some embodiments, only 1-star chess pieces are provided in the store.

Chess pieces in the auto chess game have different traits (types). For example, a trait of one chess piece may be guard and a trait of another chess piece may be mage. When a plurality of chess pieces with the same trait are on the field simultaneously, additional attribute bonuses can be obtained. For example, when three chess pieces with traits all being guard are on the field simultaneously, the three chess pieces can all be improved in defense power; and when three chess pieces with traits all being mage are on the field simultaneously, the three chess pieces can all be improved in spell attack power. Certainly, the above three chess pieces are different chess pieces. A larger quantity of chess pieces with the same trait acquired by the user indicates stronger combat power of the chess pieces. For example, when three chess pieces with traits all being mage are on the field simultaneously, the three chess pieces can all obtain a bonus of 100 to improve the spell attack power; and when five chess pieces with traits all being mage are on the field simultaneously, the five chess pieces can all obtain a bonus of 300 to improve the spell attack power. That is, in addition to improve the combat power by acquiring virtual equipment and increasing the star ratings of chess pieces, the user can also improve the combat power by acquiring chess pieces with the same trait. In some embodiments, one chess piece may correspond to two or more traits. For example, one chess piece may have both a professional trait of mage and a camp trait of beast. The user can perform chess piece matching based on the traits corresponding to the chess piece.

Figure 2:
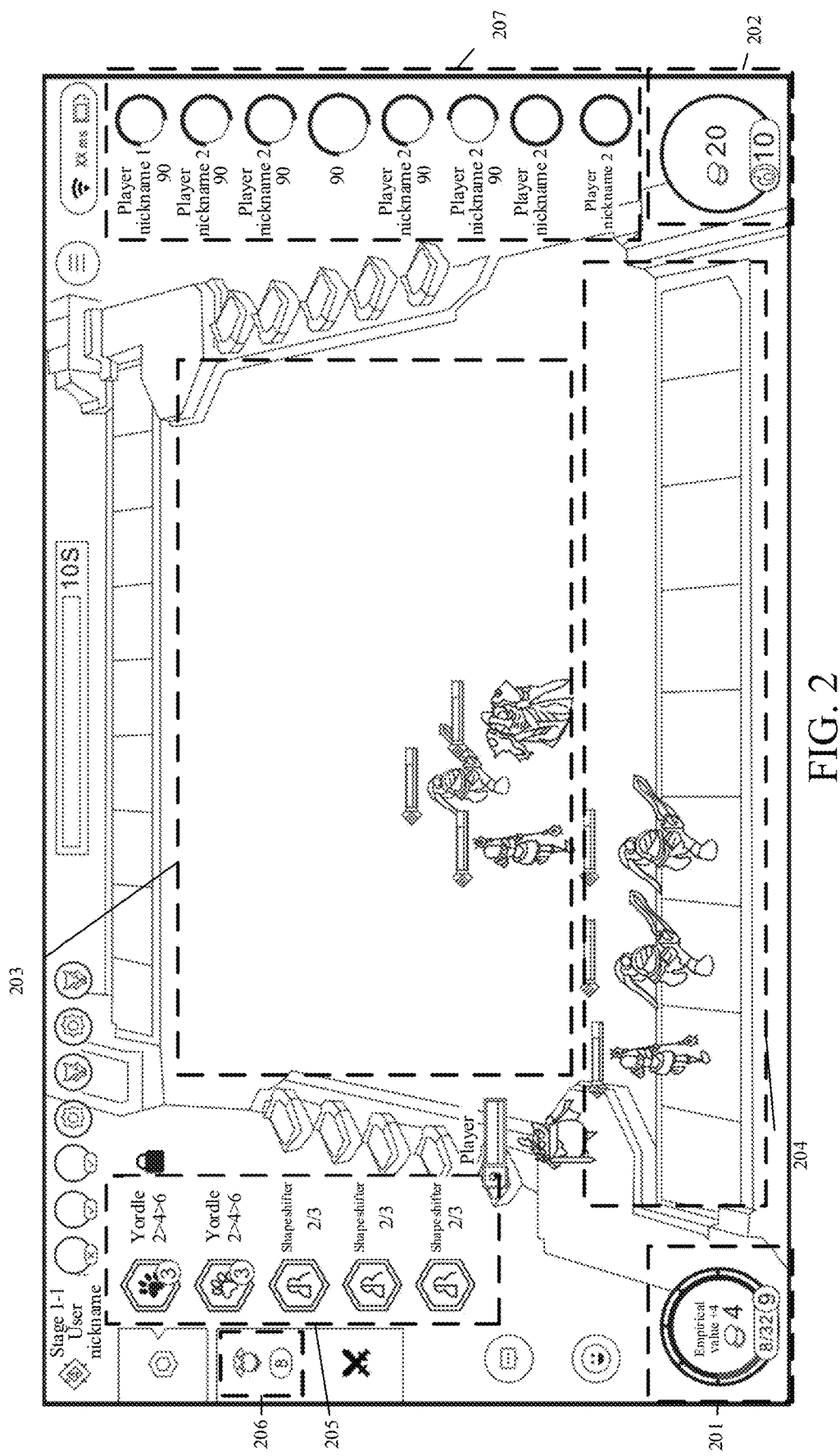
FIG. 2 is a schematic diagram of an interface according to an embodiment of this disclosure.

FIG. 2 is a schematic diagram of a game interface of an auto chess game. FIG. 2 includes an information prompt region 201, a store trigger control 202, a battlefield region 203, a preparation region 204, a trait display region 205, an equipment library 206, and a scoring region 207.

Functions of the foregoing regions are respectively described below.

The information prompt region 201 is configured for displaying a user's game level and virtual resources required to improve the game level. The user's game level decides the quantity of chess pieces that the user can place in the battlefield region 203 simultaneously. For example, at the beginning of the game, the user's game level is level 1, then the user can place 3 chess pieces in the battlefield region 203 simultaneously to battle with another user. If the user intends to increase the quantity of chess pieces placed in the battlefield region 203 simultaneously, the user needs to consume virtual resources to improve the game level. In some embodiments, each time the user improves one game level, the user can add one chess piece placed in the battlefield region 203. That is, if the user can place 3 chess pieces in the battlefield region 203 simultaneously at level 1, when the user's game level is improved to level 2, 4 chess pieces can be placed in the battlefield region 203 simultaneously, and so on. In some embodiments, the virtual resources required by the user to improve the game level decrease as the quantity of rounds increases. For example, the user's game level at the beginning of the game is level 1. If the user intends to improve the game level to level 2 in the first round, 4 gold coins need to be consumed. When the second round of the game is entered, the user intends to improve the game level from level 1 to level 2, only 2 gold coins are needed.

The store trigger control 202 is configured to display an object transaction region, that is, a store region, after being triggered. A variety of chess pieces are provided in the store region, and the user can select a chess piece that the user intends to exchange in the store region. A certain quantity of virtual resources need to be consumed to exchanging chess pieces. In some embodiments, the quantities of virtual resources consumed by the exchange of different chess pieces are different, and chess pieces having stronger combat power need to consume a larger quantity of virtual resources. The store region can be displayed when the user clicks the store trigger control 202, and can also be automatically displayed when each game round ends. The types of chess pieces provided in the store region are randomly determined by the terminal. There is a refresh control in the store region. When there is no chess piece desired by the user in the chess pieces provided in the store region, the user can click the refresh control and consume a certain quantity of virtual resources to update the chess pieces provided in the store region.

The battlefield region 203 is a region in which chess pieces battle with each other, and the user can drag a chess piece to the battlefield region 203 to battle with chess pieces of other users. In addition to this, the user can also adjust the position of the chess piece in the battlefield region 203. At the beginning of each game round, chess pieces of other users also appear in the battlefield region 203, and the chess piece of the user can battle with the chess pieces of other users in the battlefield region 203.

The preparation region 204 is configured for storing the chess pieces owned by the user but are not on the field temporarily, and if the chess pieces are on the field, they are placed in the battlefield region 203. Because three identical chess pieces are required when the user increase the star rating of the chess pieces, the preparation region 204 is also a region configured for storing these chess pieces. When the user has acquired a quantity of chess pieces required to improve the star rating of the chess pieces, the chess pieces in the battlefield region 204 will be automatically synthesized and upgraded. For example, there is one 1-star chess piece in the battlefield region 203, and there is also one identical 1-star chess piece in the preparation region 204. When the user exchanges another one identical 1-star chess piece from the store region, the 1-star chess piece in the preparation region 204 will also be synthesized to the chess pieces in the battlefield region 203, the 1-star chess piece in the battlefield region 203 will disappear, the chess pieces in the battlefield region 203 will be upgraded from 1 star to 2 stars, and a space will be left in the preparation region 204.

In some embodiments, positions for storing chess pieces in the preparation region 204 are limited, and when all the positions for storing chess pieces in the preparation region 204 are occupied, the user cannot place chess pieces in the preparation region 204.

The trait display region 205 is configured for displaying classification icons, that is, trait icons. The trait icon is used for prompting that the user has the trait possessed by the chess piece. The "Yordle" and the "shapeshifter" in FIG. 2 are also two traits. For example, when the user owns a chess piece with a trait of mage, an icon used for representing the trait of mage can be displayed in the trait display region. In some embodiments, the color of the icon is gray, indicating that the attribute bonus corresponding to the trait of mage is not activated; a number 1/3 is displayed next to the icon, where 1 represents the quantity of chess pieces with the trait of mage existing in the battlefield region 203, and 3 represents the quantity of chess pieces required to activate the attribute corresponding to the trait of mage. When there are three chess pieces with the trait of mage in the battlefield region 203, the icon used for representing the trait of mage will change from being gray to being colorful, indicating that the attribute bonus corresponding to the trait of mage is activated.

The equipment library 206 is configured for users to view the types and quantities of owned virtual equipment.

The scoring region 207 is configured for displaying a nickname and a score of each user. In some embodiments, in the scoring region 207, avatars of users are sorted according to virtual hit points of the users, and the users can determine their rankings in the current game based on positions of their avatars in the scoring region 207.

Figure 3:
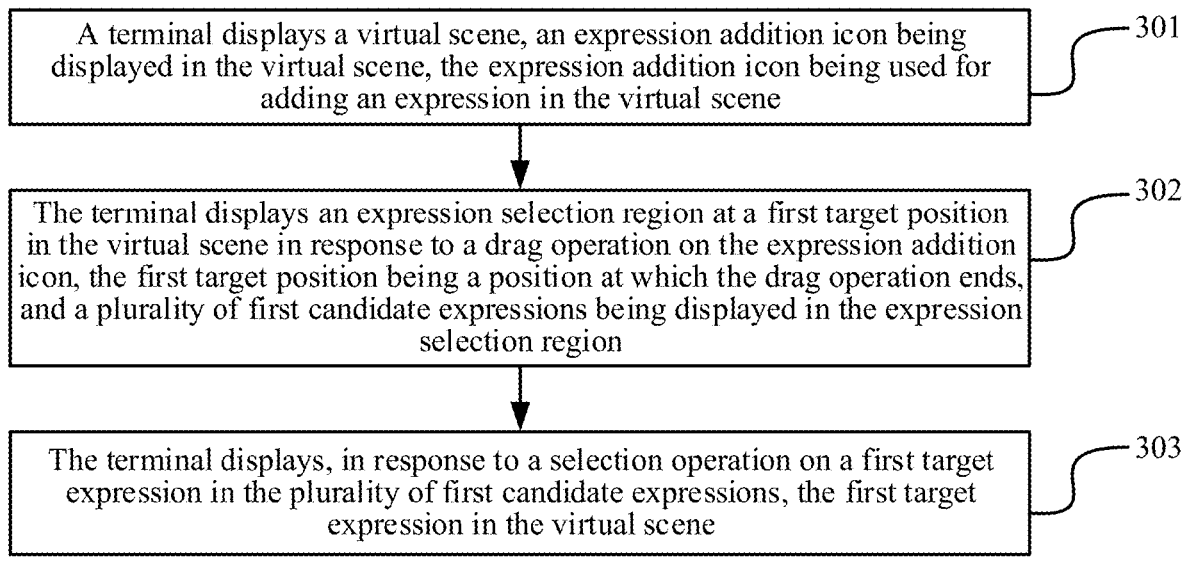
FIG. 3 is a flowchart of a method for displaying an expression in a virtual scene according to an embodiment of this disclosure.

In this embodiment of this disclosure, the computer device can be configured as a terminal or a server. In some embodiments, the terminal is used as the execution subject to implement the technical solutions provided in the embodiments of this disclosure, or the technical solutions provided in this disclosure are implemented through the interaction between the terminal and the server, which is not limited in the embodiments of this disclosure. A description is provided below by using an example in which the execution subject is a terminal:

FIG. 3 is a flowchart of a method for displaying an expression in a virtual scene according to an embodiment of this disclosure. Referring to FIG. 3, the method includes the following steps:

301: A terminal displays a virtual scene, an expression addition icon being displayed in the virtual scene, the expression addition icon being used for adding an expression in the virtual scene.

The expression addition icon is an icon corresponding to an expression addition control. A user clicks the expression addition icon, that is, clicks the expression addition control; and the user drags the expression addition icon, that is, drags the expression addition control.

302: The terminal displays an expression selection region at a first target position in the virtual scene in response to a drag operation on the expression addition icon, the first target position being a position at which the drag operation ends, and a plurality of first candidate expressions being displayed in the expression selection region.

In some embodiments, the first candidate expressions are expressions configured in advance by a technician, such as expressions drawn in advance by art people; or are expressions downloaded from a database, where the database is configured to maintain expressions owned by the user; or are expressions configured by the user, such as expressions uploaded, exchanged, or drawn by the user. This is not limited in this embodiment of this disclosure. The first candidate expressions are displayed in the expression selection region, and the user can select a first candidate expression in the expression selection region. By displaying the first candidate expressions in the expression selection region, the user can intuitively view the plurality of first candidate expressions, and the efficiency for viewing the first candidate expressions is improved, thereby improving the user's information acquisition efficiency.

303: The terminal displays, in response to a selection operation on a first target expression in the plurality of first candidate expressions, the first target expression in the virtual scene.

In some embodiments, if any first candidate expression in the expression selection region is clicked, the first candidate expression is the selected first target expression.

By using the technical solutions provided in the embodiments of this disclosure, a user can trigger display of an expression selection region by dragging an expression addition icon, so that expression selection can be performed based on the expression selection region, and therefore, a selected first target expression is displayed at a first target position in a virtual scene. Because the first target position is a position at which the drag operation ends, a display position of the first target expression can be changed by adjusting the drag operation. The operations are simple and convenient, and the man-machine interaction efficiency is high. For example, when the user intends to send an expression in the virtual scene, by performing a drag operation on the expression addition icon and then selecting, in the displayed expression selection region, the first target expression that the user intends to display, the expression can be sent. Compared with the manner of first calling up a chat window, calling an expression selection panel in the chat window, selecting an expression in the expression selection panel, and then clicking a send control in the chat window to send the expression, the operations are simple and convenient, and the man-machine interaction efficiency is improved.

The foregoing steps 301 to 303 are a brief description of the technical solutions provided in this disclosure. The technical solutions provided in this disclosure will be described below in detail with reference to some examples.

Figure 4:
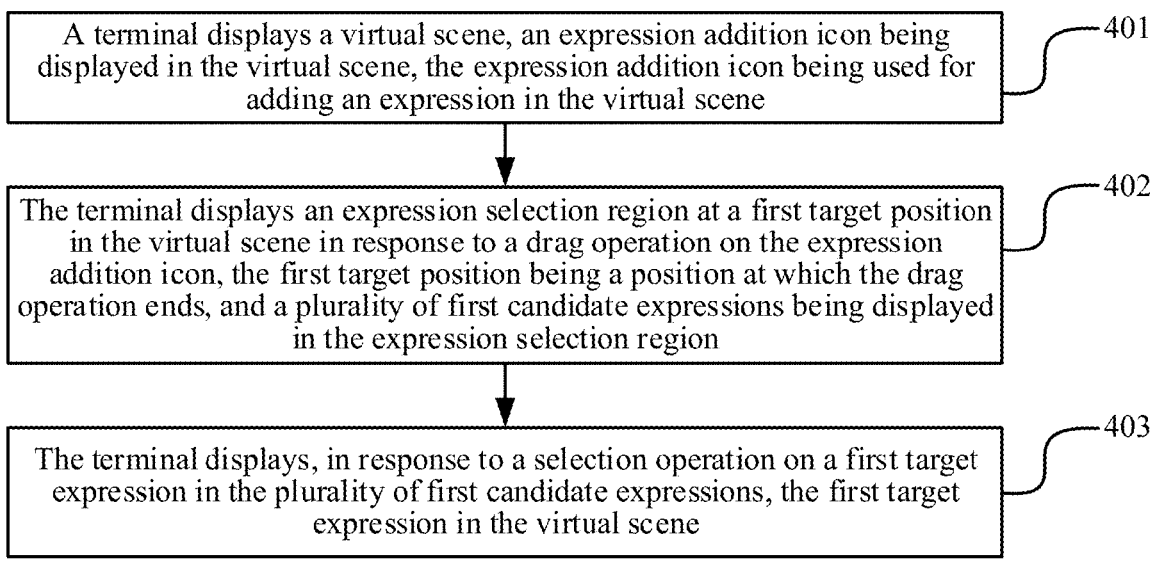
FIG. 4 is another flowchart of a method for displaying an expression in a virtual scene according to an embodiment of this disclosure.

FIG. 4 is another flowchart of a method for displaying an expression in a virtual scene according to an embodiment of this disclosure, in which a computer device is configured as a terminal, and the terminal is used as the execution subject. Referring to FIG. 4, the method includes the following steps:

401: A terminal displays a virtual scene, an expression addition icon being displayed in the virtual scene, the expression addition icon being used for adding an expression in the virtual scene.

In some embodiments, the virtual scene is a game scene of an auto chess game, and a controlled virtual object, a plurality of first-type virtual objects, and a plurality of second-type virtual objects are displayed in the virtual scene. The controlled virtual object is a virtual object controlled by the terminal, and a user can control, by using the terminal, the virtual object to move in the virtual scene. In some embodiments, the controlled virtual object is a "virtual image" of the user in the virtual scene. The first-type virtual objects are "chess pieces" of the user in the auto chess game, the second-type virtual objects are "chess pieces" of other users battling with the user in the auto chess game, or the second-type virtual objects are NPCs, which is not limited in this embodiment of this disclosure. In some embodiments, before the beginning of each round, the user can adjust the first-type virtual objects in the virtual scene, that is, adjust the chess pieces "on the field".

In some embodiments, when the user starts a competitive battle, the terminal displays a virtual scene corresponding to the current competitive battle. A competitive battle is also an auto chess game. The terminal displays the expression addition icon at a first icon position in the virtual scene. The first icon position is set by a technician according to an actual situation, or set by the user in the setting interface of the virtual scene, which is not limited in this embodiment of this disclosure. In some embodiments, the terminal displays the expression addition icon in the lower left corner of the virtual scene.

Figure 5:
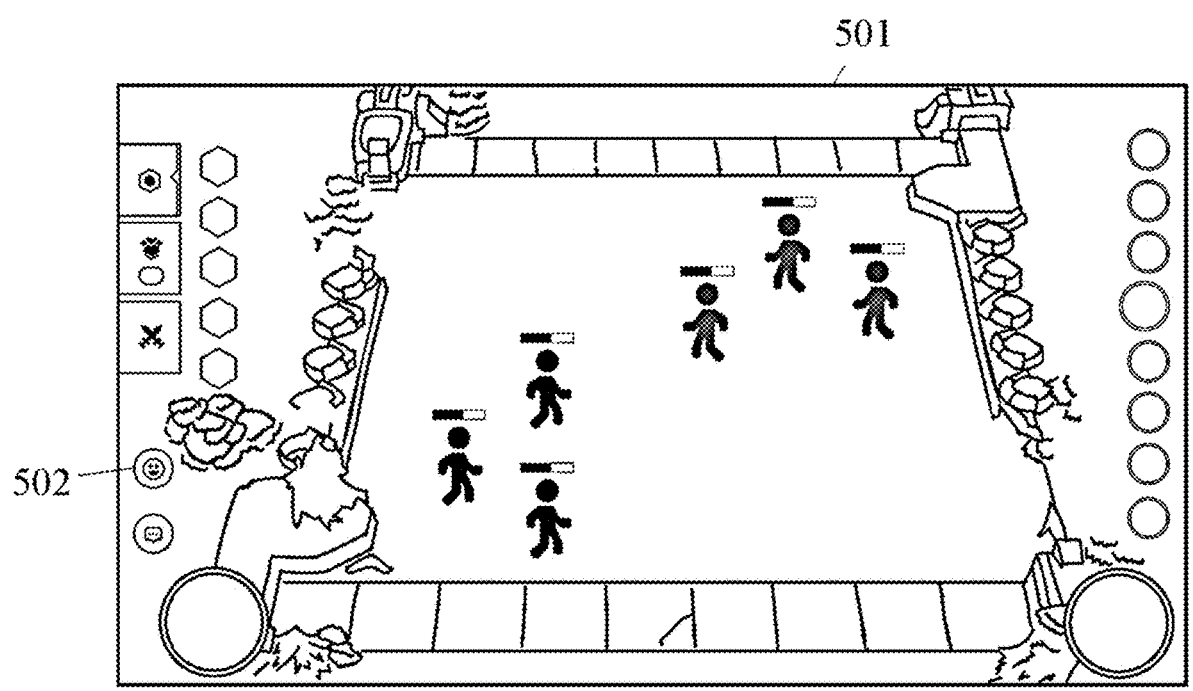
FIG. 5 is another schematic diagram of an interface according to an embodiment of this disclosure.

For example, referring to FIG. 5, the terminal displays a virtual scene 501, and an expression addition icon 502 is displayed in the virtual scene 501.

In some implementations, before displaying the virtual scene, the terminal can further display an expression setting interface of the virtual scene. A plurality of expressions are displayed in the expression setting interface, and the user can perform selection on the plurality of expressions in the expression setting interface. The selected expression is an expression that can be displayed in the virtual scene. In some embodiments, an expression drawing control is further displayed in the expression setting interface. In response to a click operation on the expression drawing control, the terminal displays an expression drawing interface. A variety of drawing tools are displayed in the expression drawing interface, and the user can use these drawing tools to perform drawing in the expression drawing interface. In response to a click operation on a storage control in the expression drawing interface, the terminal stores an image in the expression drawing interface as an expression, and displays the expression in the expression setting interface for the user to select. By providing the expression setting interface and the expression drawing interface, the user can customize expressions. Because operations for customizing expressions are convenient, and the process is simple, the man-machine interaction efficiency is high.

402: The terminal displays an expression selection region at a first target position in the virtual scene in response to a drag operation on the expression addition icon, the first target position being a position at which the drag operation ends, and a plurality of first candidate expressions being displayed in the expression selection region.

In some embodiments, in response to the drag operation on the expression addition icon, the terminal can display the expression selection region at the position at which the drag operation ends, where the position at which the drag operation ends is the first target position. By displaying the expression selection region at the position at which the drag operation ends, the user can control the display position of the expression selection region through the drag operation. Because the drag operation is simple, the man-machine interaction efficiency for triggering the display of the expression selection region is relatively high.

Figure 6:
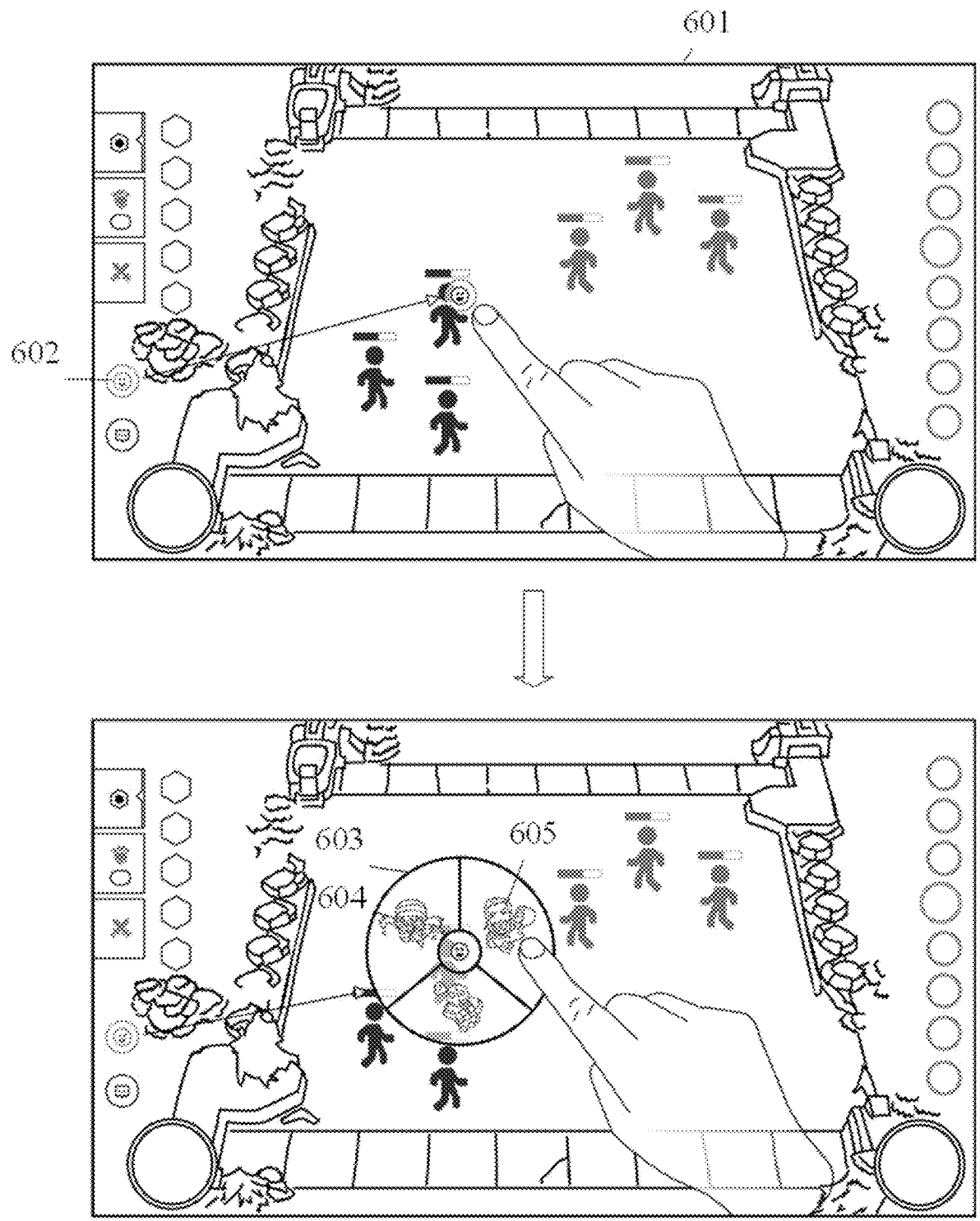
FIG. 6 is another schematic diagram of an interface according to an embodiment of this disclosure.

For example, referring to FIG. 6, an expression addition icon 602 is displayed in a virtual scene 601. In response to a drag operation on the expression addition icon 602, the terminal displays an expression selection region 603 at a position at which the drag operation ends. A plurality of first candidate expressions 604 are displayed in the expression selection region 603. In some embodiments, when a display time of the expression selection region meets a target time condition, the expression selection region is no longer displayed.

In some embodiments, the expression selection region includes a first subregion and a second subregion, the first subregion being configured for displaying type icons of expressions; and the terminal displays the first subregion and the second subregion at the first target position in response to the drag operation on the expression addition icon. The terminal displays, in response to a selection operation on a first type icon in the first subregion, the plurality of first candidate expressions corresponding to the first type icon in the second subregion. By dividing the expression selection region into the first subregion and the second subregion, the type of expressions displayed in the second subregion can be switched by triggering the first subregion. The operations are simple and convenient, and the man-machine interaction efficiency is high.

Based on the foregoing implementations, in some embodiments, the terminal switches, in response to a selection operation on a second type icon in the first subregion, the plurality of first candidate expressions in the second subregion to a plurality of second candidate expressions, the second candidate expressions being expressions corresponding to the second type icon. In some embodiments, the first subregion is a circular region, the second subregion is an annular region inscribed to the first subregion, and the first subregion and the second subregion have the same circle center. Because the user can select different type icons in the first subregion to control the terminal to display different types of candidate expressions in the second subregion, the type icons displayed in the first subregion may also be referred to as classification icons of candidate expressions. By setting a plurality of corresponding expressions for different type icons, the user can select different types of expressions by triggering different type icons. The operations are simple and convenient, and the man-machine interaction efficiency is high.

In some embodiments, the expression selection region includes a plurality of subregions, and the plurality of first candidate expressions are respectively displayed in the plurality of subregions. By dividing the expression selection region into a plurality of subregions, the terminal can display the plurality of first candidate expressions in the plurality of subregions respectively, so that different subregions can separate the plurality of first candidate expressions, and therefore, the user can intuitively view and select a first candidate expression based on the different subregions. The viewing efficiency is high, the selection manner is simple and quick, and the man-machine interaction efficiency is high.

For example, the expression selection region is a circular region, one of the subregions is one part of the circular region, and a type icon corresponding to the plurality of first candidate expressions is displayed in the center of the circular region. In some embodiments, the expression selection region is a region that can be rotated. In response to a slide operation on the expression selection region, the terminal controls the expression selection region to rotate in the direction of the slide operation, so that the user can slide the expression selection region. During the rotation of the expression selection region, the first candidate expressions will also be rotated. The user can rotate the first candidate expressions to a desired direction, and then select an expression. In this case, the expression selection region is also referred to as an expression roulette. The type icons displayed in the center of the circular region are used for representing the types of the plurality of first candidate expressions displayed in the subregions, and the user can determine the types of the plurality of first candidate expressions by viewing the type icons.

In some embodiments, at least one first virtual object is displayed in the virtual scene, and the first candidate expressions are expressions corresponding to the first virtual object. In some embodiments, the first virtual object is a virtual object controlled by a terminal login user, and when the user controls any first virtual object to be on the field, the terminal adds a first candidate expression corresponding to the first virtual object in the expression selection region. Being on the field refers to controlling the first virtual object to be displayed in the virtual scene, or it refers to dragging the first virtual object from the preparation region 204 to the battlefield region 203. Referring to FIG. 2, this is not limited in this embodiment of this disclosure. The correspondence between the first virtual object and the first candidate expressions is set by a technician according to an actual situation, or matched by the terminal based on an image recognition algorithm. When the first virtual object is on the field, the terminal performs image recognition on the first virtual object to obtain a label of the first virtual object. Based on the label of the first virtual object, the terminal performs matching in an expression database to obtain a first candidate expression corresponding to the first virtual object. A manner in which the terminal determines the first candidate expression corresponding to the first virtual object is not limited in this embodiment of this disclosure. That the terminal adds the first candidate expression corresponding to the first virtual object in the expression selection region means that the terminal adds the first candidate expression corresponding to the first virtual object to a folder corresponding to the expression selection region, and the terminal can display the first candidate expression in the expression selection region when displaying the expression selection region.

In some embodiments, the first virtual object includes not only the virtual object controlled by the terminal login user, but also a virtual object controlled by another user battling with the user. When any first virtual object is on the field, the terminal adds a first candidate expression corresponding to the first virtual object in the expression selection region, and the user can select an expression in the expression selection region. The method for the terminal to add the first candidate expression corresponding to the first virtual object in the expression selection region belongs to the same inventive concept as the foregoing embodiment, which is not limited in this embodiment of this disclosure. By adding an expression corresponding to the first virtual object on the field in the expression selection region, the expressions displayed in the expression selection region are diverse and random, and the user can quickly send an expression based on the expression selection control. Compared with the manner of setting several fixed expressions in the expression selection region, the man-machine interaction efficiency is higher.

In some embodiments, at least one first virtual object is displayed in the virtual scene, and when the expression addition icon is dragged to a position at which any first virtual object is located, the expression selection region is displayed at the position at which the first virtual object is located, where the position at which the first virtual object is located is the first target position. The expression selected based on the expression selection region is regarded as an expression sent to the first virtual object. Through this implementation, the user can decide a virtual object to which the expression is sent during the game, which provides the user with richer expression sending manners, thereby improving the user's game experience. In addition, because when the expression selection region is dragged to a position at which a first virtual object is located, an expression can be sent to the first virtual object, compared with the manner of selecting a first virtual object and then selecting an expression for sending, or selecting an expression and then selecting a first virtual object for sending, the operation steps are simple, and the man-machine interaction efficiency is high.

In some embodiments, a plurality of user avatars are displayed in the virtual scene, and one user avatar corresponds to one user participating in the competitive battle. When the expression addition icon is dragged to a position at which any user avatar is located, the expression selection region is displayed at the position at which the user avatar is located, where the position at which the user avatar is located is the first target position. The expression selected based on the expression selection region is regarded as an expression sent to the user corresponding to the user avatar. Through this implementation, the user can decide a user to which the expression is sent during the game, which provides the user with richer expression sending manners, thereby improving the user's game experience.

403: The terminal displays, in response to a selection operation on a first target expression in the plurality of first candidate expressions, the first target expression in the virtual scene.

In some embodiments, the first target expression is any expression in the plurality of first candidate expressions. In response to the selection operation on the first target expression, the terminal enlarges and displays the first target expression in the virtual scene. For example, the first target expression is a vector graphic, and when displaying the first target expression, the terminal can enlarge and display the first target expression, which is convenient for the user to view. In some embodiments, the position at which the terminal displays the first target expression in the virtual scene is the first target position. Because the expression selection region is also displayed at the first target position, the position at which the terminal displays the first target expression in the virtual scene is the same as the position at which the terminal displays the expression selection region. The terminal displays the first target expression at the first target position in the virtual scene in response to the selection operation on the first target expression in the plurality of first candidate expressions.

Figure 7:
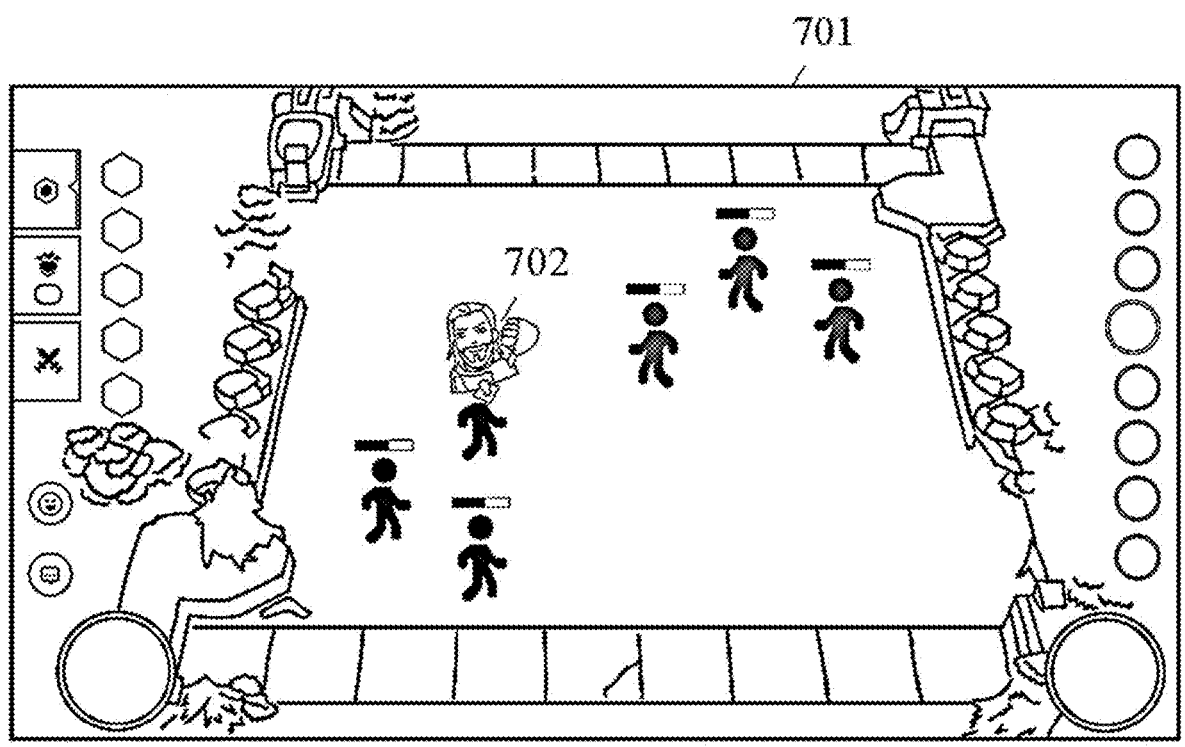
FIG. 7 is another schematic diagram of an interface according to an embodiment of this disclosure.

For example, when the first target expression in the plurality of first candidate expressions is clicked, the terminal enlarges and displays the first target expression at the first target position in the virtual scene. If the first target position is a position at which the drag operation on the expression addition icon ends, the terminal can display the first target expression at the ending position. If the user intends to display an expression at a specified position in the virtual scene, the user may drag an expression addition control to the specified position, and the first target expression selected based on the expression selection region can be displayed at the specified position. For example, referring to FIG. 6 and FIG. 7, in response to a click operation on a first target expression 605, the terminal enlarges and displays the first target expression 605 at a first target position in a virtual scene 701, that is, displays an enlarged first target expression 702 in the virtual scene 701.

In some embodiments, the terminal plays an animation corresponding to the first target expression in the virtual scene in response to the selection operation on the first target expression. The animation corresponding to the first target expression is configured by a technician. For example, after making the expression and the animation corresponding to the expression, the technician binds and stores the expression and the animation corresponding to the expression. After the first target expression is selected, the terminal can directly load the animation corresponding to the first target expression, and play the animation in the virtual scene.

For example, when the first target expression in the plurality of first candidate expressions is clicked, the terminal loads the animation corresponding to the first target expression, and plays the animation at the first target position in the virtual scene. If the first target position is a position at which the drag operation on the expression addition icon ends, the terminal can play the animation at the ending position.

In some embodiments, at least one first virtual object is displayed in the virtual scene, and the first candidate expressions are expressions corresponding to the at least one first virtual object. The terminal can control a target virtual object to perform an action corresponding to the first target expression, the target virtual object being a first virtual object corresponding to the first target expression in the at least one first virtual object. Control herein means display, and the control process is performed by a server. The terminal displays the process in which the target virtual object performs the action, and the target virtual object is directly controlled by the terminal to perform the action, which is not limited in this embodiment of this disclosure. The correspondence between the first target expression and the action is set by a technician according to an actual situation. For example, after making the first target expression and the corresponding action, the technician can bind and store the first target expression and the corresponding action. In response to the selection operation on the first target expression, the terminal controls the target virtual object to perform the action corresponding to the first target expression. In this implementation, in addition to displaying the first target expression in the virtual scene, the terminal can also control the target virtual object to perform the corresponding action, which enriches the display effects of the first target expression and improves the user's game experience.

In some embodiments, in response to the selection operation on the first target expression in the plurality of first candidate expressions, the terminal controls the controlled virtual object to move to the first target position, and displays the first target expression at the first target position. The controlled virtual object is a virtual object controlled by a user login terminal. The controlling in controlling the controlled virtual object by the terminal means displaying, and the control process is performed by a server. The terminal displays the process in which the controlled virtual object performs the action, or the controlled virtual object is directly controlled by the terminal to perform the action, which is not limited in this embodiment of this disclosure. In this implementation, when displaying the first target expression, the terminal can further control the controlled virtual object to move to the display position of the first target expression, to enrich the effects of displaying the first target expression.

All the exemplary technical solutions may be combined randomly to form exemplary embodiments of this disclosure.

Figure 8:
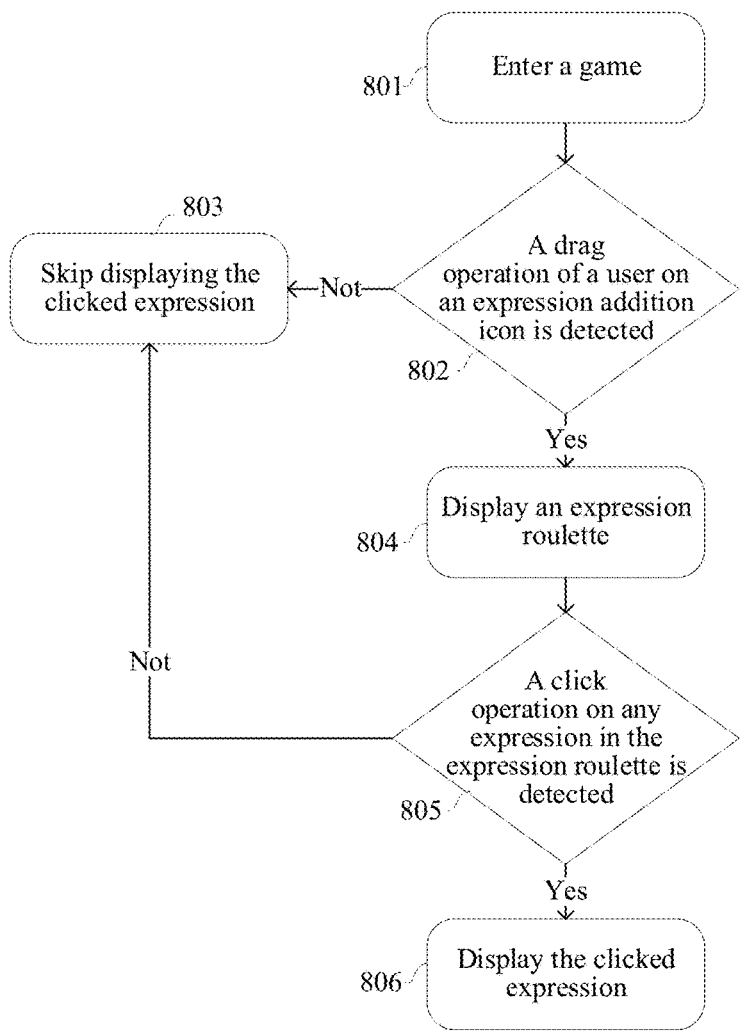
FIG. 8 is a logic block diagram of a method for displaying an expression in a virtual scene according to an embodiment of this disclosure.

FIG. 8 shows a logical block diagram of the foregoing steps 401 to 403. Referring to FIG. 8, after the game is entered (801), if a drag operation of the user on the expression addition icon is detected (802), an expression roulette is displayed (804), and the expression roulette is the expression selection region. If a click operation on any expression in the expression roulette is detected (805), the clicked expression is displayed at the corresponding position of the drag operation (806). If no drag operation of the user on the expression addition icon is detected, no expression is displayed (803); and if no click operation of the user in the expression roulette is detected, no expression is displayed.

By using the technical solutions provided in the embodiments of this disclosure, a user can trigger display of an expression selection region by dragging an expression addition icon, so that expression selection can be performed based on the expression selection region, and therefore, a selected first target expression is displayed at a first target position in a virtual scene. Because the first target position is a position at which the drag operation ends, a display position of the first target expression can be changed by adjusting the drag operation. The operations are simple and convenient, and the man-machine interaction efficiency is high. For example, when the user intends to send an expression in the virtual scene, by performing a drag operation on the expression addition icon and then selecting, in the displayed expression selection region, the first target expression that the user intends to display, the expression can be sent. Compared with the manner of first calling up a chat window, calling an expression selection panel in the chat window, selecting an expression in the expression selection panel, and then clicking a send control in the chat window to send the expression, the operations are simple and convenient, and the man-machine interaction efficiency is improved.

Figure 9:
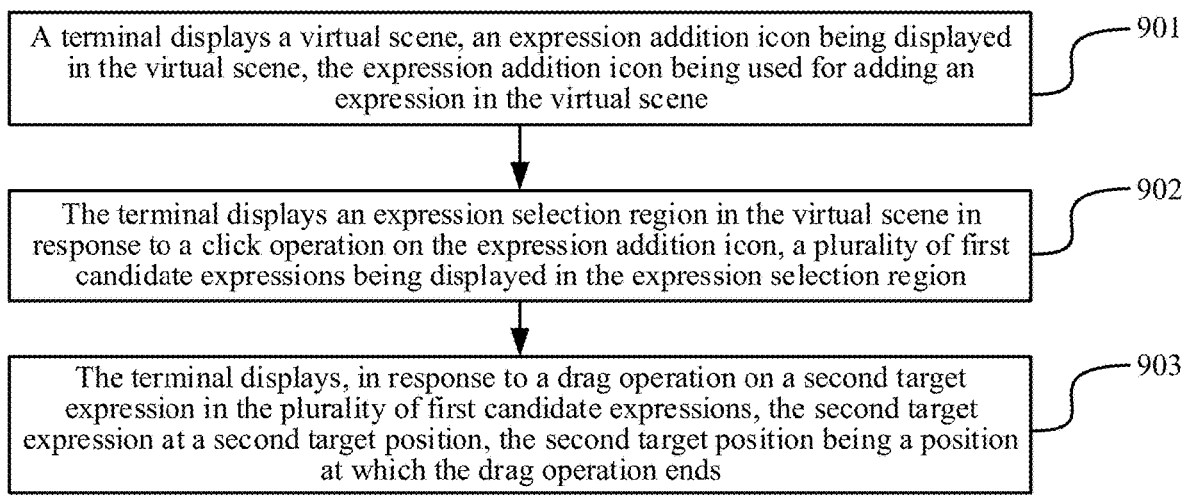
FIG. 9 is another flowchart of a method for displaying an expression in a virtual scene according to an embodiment of this disclosure.

In addition to the foregoing steps 401 to 403, this disclosure further provides another method for displaying an expression in a virtual scene. An example in which a computer device is configured as a terminal, and the terminal is used as the execution subject is used. Referring to FIG. 9, the method includes the following steps:

901: A terminal displays a virtual scene, an expression addition icon being displayed in the virtual scene, the expression addition icon being used for adding an expression in the virtual scene.

The process of displaying the virtual scene by the terminal belongs to the same inventive concept as step 401, and for the implementation process, reference may be made to the related description of step 401.

902: The terminal displays an expression selection region in the virtual scene in response to a click operation on the expression addition icon, a plurality of first candidate expressions being displayed in the expression selection region.

In some embodiments, the terminal displays the expression selection region at a fourth target position in the virtual scene in response to a click operation on the expression addition icon, the fourth target position being a position adjacent to the expression addition icon.

Figure 10:
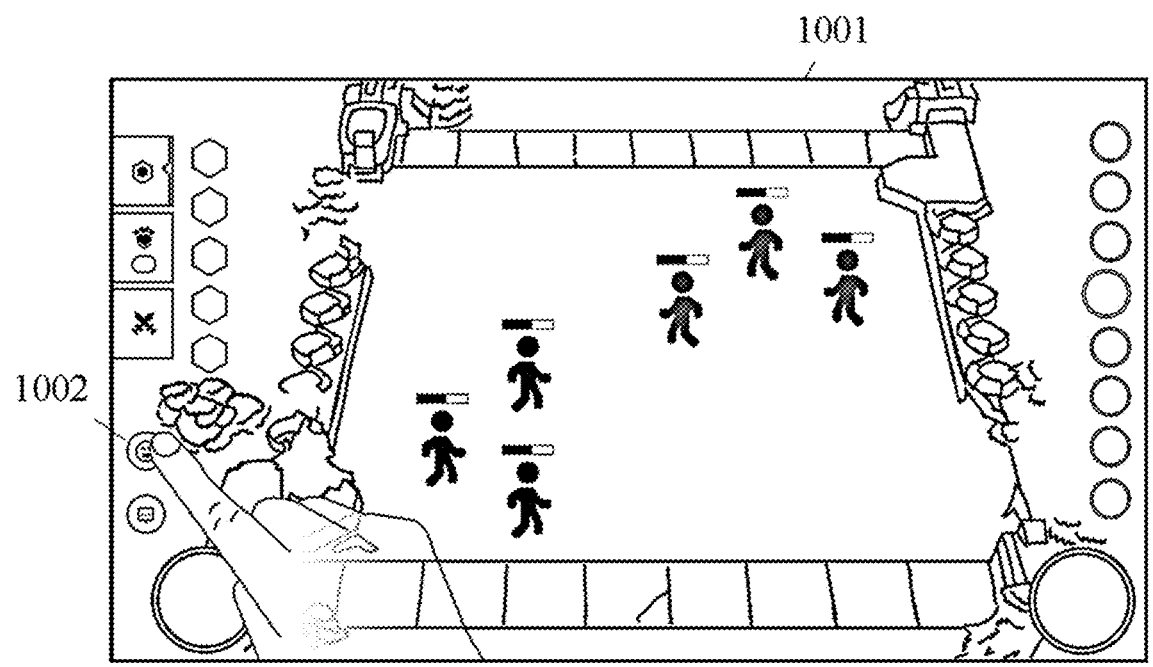
FIG. 10 is another schematic diagram of an interface according to an embodiment of this disclosure.
Figure 11:
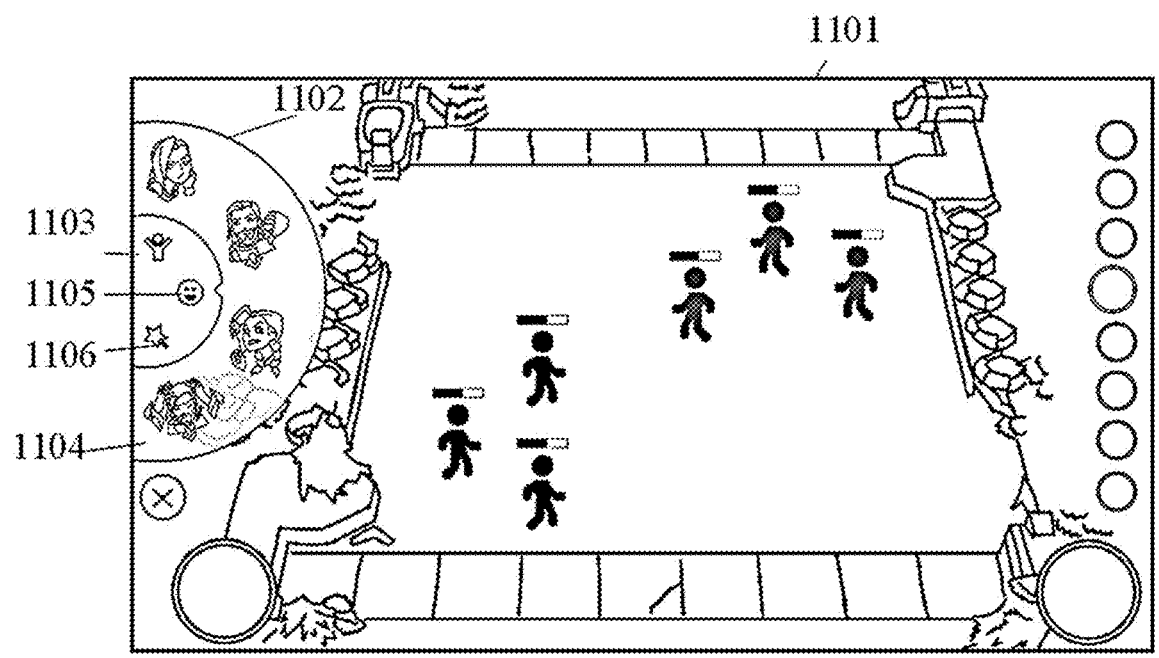
FIG. 11 is another schematic diagram of an interface according to an embodiment of this disclosure.

For example, referring to FIG. 10 and FIG. 11, the terminal displays an expression selection region 1102 at a fourth target position in a virtual scene 1101 in response to a click operation on an expression addition icon 1002 in a virtual scene 1001, a plurality of first candidate expressions being displayed in the expression selection region.

In some embodiments, the expression selection region includes a first subregion and a second subregion, the first subregion being configured for displaying type icons of expressions; and the terminal displays the first subregion and the second subregion at the first target position in response to the drag operation on the expression addition icon. The terminal displays, in response to a selection operation on a first type icon in the first subregion, the plurality of first candidate expressions corresponding to the first type icon in the second subregion. By dividing the expression selection region into the first subregion and the second subregion, the type of expressions displayed in the second subregion can be switched by triggering the first subregion. The operations are simple and convenient, and the man-machine interaction efficiency is high. In addition, by setting a plurality of corresponding expressions for different type icons, the user can select different types of expressions by triggering different type icons. The operations are simple and convenient, and the man-machine interaction efficiency is high.

For example, referring to FIG. 11, the expression selection region 1102 includes a first subregion 1103 and a second subregion 1104, and a plurality of type icons are displayed in the first subregion 1103. The terminal displays, in response to a click operation on a first type icon 1105 in the first subregion 1103, the plurality of first candidate expressions corresponding to a first type icon 1105 in the second subregion 1104.

Based on the foregoing implementations, in some embodiments, the terminal switches, in response to a selection operation on a second type icon in the first subregion, the plurality of first candidate expressions in the second subregion to a plurality of second candidate expressions, the second candidate expressions being expressions corresponding to the second type icon. In some embodiments, the first subregion is a circular region, the second subregion is an annular region inscribed to the first subregion, and the first subregion and the second subregion have the same circle center.

For example, the terminal displays, in response to a click operation on a second type icon 1106 in the first subregion 1103, the plurality of second candidate expressions corresponding to the second type icon 1106 in the second subregion 1104.

In some embodiments, the expression selection region includes a plurality of subregions, and the plurality of first candidate expressions are respectively displayed in the plurality of subregions. In this implementation, the terminal can display the first candidate expressions in the plurality of subregions respectively, and different subregions can separate the plurality of first candidate expressions, so that the user can select a desired first candidate expression in the different subregions. By dividing the expression selection region into a plurality of subregions, the terminal can display the plurality of first candidate expressions in the plurality of subregions respectively, so that different subregions can separate the plurality of first candidate expressions, and therefore, the user can intuitively view and select a first candidate expression through the different subregions. The viewing efficiency is high, the selection manner is simple and quick, and the man-machine interaction efficiency is high.

For example, the expression selection region is a circular region, one of the subregions is one part of the circular region, and a type icon corresponding to the plurality of first candidate expressions is displayed in the center of the circular region. In some embodiments, the expression selection region is a region that can be rotated. In response to a slide operation on the expression selection region, the terminal controls the expression selection region to rotate in the direction of the slide operation, so that the user can slide the expression selection region. During the rotation of the expression selection region, the first candidate expressions will also be rotated. The user can rotate the first candidate expressions to a desired direction, and then select an expression. In this case, the expression selection region is also referred to as an expression roulette. The type icons displayed in the center of the circular region is used for representing the types of the plurality of first candidate expressions displayed in the subregions, and the user can determine the types of the plurality of first candidate expressions by viewing the type icons.

In some embodiments, at least one first virtual object is displayed in the virtual scene, and the first candidate expressions are expressions corresponding to the first virtual object. In some embodiments, the first virtual object is a virtual object controlled by a terminal login user, and when the user controls any first virtual object to be on the field, the terminal adds a first candidate expression corresponding to the first virtual object in the expression selection region. By adding an expression corresponding to the first virtual object on the field in the expression selection region, the expressions displayed in the expression selection region are diverse and random, and the user can quickly send an expression based on the expression selection control. Compared with the manner of setting several fixed expressions in the expression selection region, the man-machine interaction efficiency is higher.

903: The terminal displays, in response to a drag operation on a second target expression in the plurality of first candidate expressions, the second target expression at a second target position, the second target position being a position at which the drag operation ends.

In some embodiments, the second target position is a position at which the drag operation ends. That is, the user can perform a drag operation on a first candidate expression in the expression selection region, and the dragged first candidate expression may be regarded as a selected second target expression. The user can control the position at which the terminal displays the second target expression based on the position at which the drag operation ends.

In some embodiments, if the terminal is a device with a touch function such as a mobile phone or a tablet, the drag operation on the second target expression means that the user places a finger on the position corresponding to the second target expression, presses the finger, and then controls the finger to perform dragging on the screen, but when the user intends to end the drag operation, the user only needs to lift the finger. For the terminal, when it is detected that a click operation on the second target expression meets a target condition, the terminal sets the second target expression to a draggable state, where the draggable state means that the second target expression can move along movement of the drag operation. The terminal acquires the position of the drag operation on the screen in real time, and displays the second target expression at the position at which the drag operation ends. From the perspective of the user, the second target expression in the draggable state is always located below the finger on the screen. When it is detected at the second target position that the drag operation ends, the terminal displays the second target expression at the position at which the drag operation ends. That the click operation on the second target expression meets the target condition means that a duration of the click operation on the second target expression is greater than or equal to a time threshold, or a force of the click operation on the second target expression is greater than or equal to a force threshold. The time threshold and the force threshold are set by a technician according to an actual situation, which is not limited in this embodiment of this disclosure.

Figure 12:
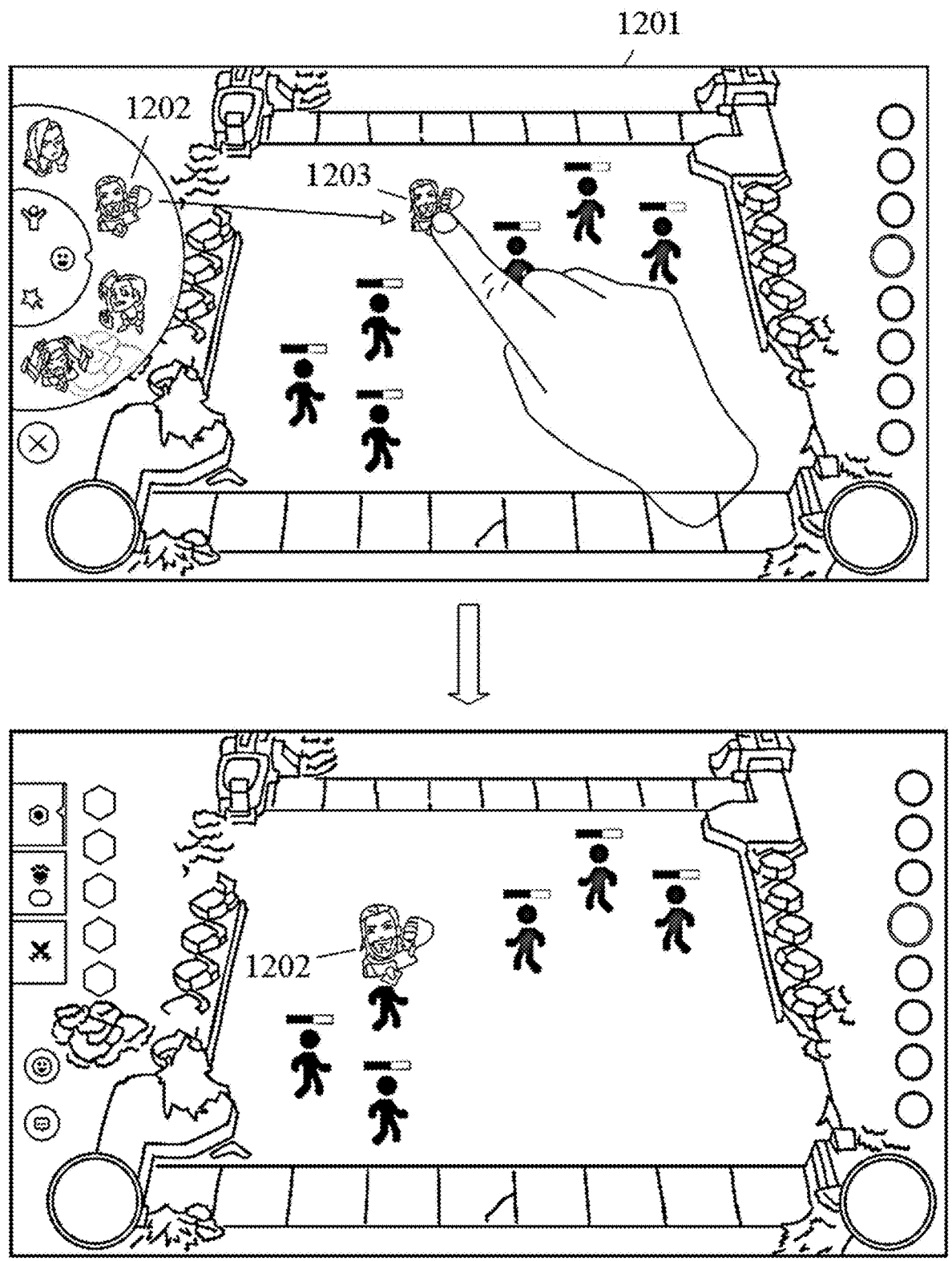
FIG. 12 is a schematic diagram of functional module division according to an embodiment of this disclosure.

For example, referring to FIG. 12, when a second target expression 1202 in a virtual scene 1201 is dragged to a second target position 1203, the terminal displays the second target expression 1202 at the second target position 1203.

In some embodiments, a plurality of first virtual objects are displayed in the virtual scene, and the terminal displays, when the second target expression is dragged to a third target position and a distance between any one of the first virtual objects and the third target position meets a target condition, the second target expression at the second target position at which the first virtual object is located. In this manner, the terminal can display the second target expression above a first virtual object meeting the target condition, which can be used to indicate that the second target expression is an expression made by the first virtual object, thereby enriching the display of the second target expression, and facilitating the user in conveying information through the second target expression. Because the drag operation is simple to perform, the expression sending efficiency is improved, thereby improving the man-machine interaction efficiency.

For example, a first virtual object is displayed in the virtual scene, and when the second target expression is dragged to a third target position, the terminal determines a distance between the first virtual object and the third target position. When the distance between the first virtual object and the third target position is less than or equal to a distance threshold, the terminal determines that the distance between the first virtual object and the third target position meets the target condition, and displays the second target expression at the second target position at which the first virtual object is located. From the perspective of the user, when the second target expression is dragged near the first virtual object, the second target expression can be displayed above the first virtual object. Certainly, a description is provided above by using an example in which one virtual object is displayed in the virtual scene. In other implementations, a plurality of first virtual objects can be displayed in the virtual scene. In this case, when the second target expression is dragged to the third target position, the terminal determines distances between the plurality of first virtual objects and the third target position, determines a first virtual object with the shortest distance to the third target position in the plurality of first virtual objects as a first virtual object with a distance to the third target position meeting the target condition, and displays the second target expression above the first virtual object. The user can use this display manner to control the terminal to display the second target expression above different first virtual objects to convey different information.

In some embodiments, when the first virtual object moves in the virtual scene, the terminal can adjust the display position of the second target expression, so that the second target expression is always displayed above the first virtual object. By dragging the second target expression to the neighborhood of the first virtual object, the terminal displays the second target expression above the first virtual object, so that when the first virtual object moves in the virtual scene, the second target expression will move along the first virtual object, thereby achieving the effect that the second target expression is always kept above the first virtual object.

In some embodiments, a plurality of first virtual objects are displayed in the virtual scene, and when the second target expression is dragged to the third target position and distances between at least two of the first virtual objects and the third target position meet the target condition, the second target expression is displayed at the second target position at which a second virtual object is located, the second virtual object being a first virtual object controlled by the terminal in the at least two first virtual objects.

For example, when the second target expression is dragged to the third target position, the terminal determines distances between the plurality of first virtual objects in the virtual scene and the third target position. When distances between at least two first virtual objects and the third target position are less than or equal to the distance threshold, the terminal determines that the distances between the at least two first virtual objects and the third target position meet the target condition. The terminal determines a second virtual object from the at least two first virtual objects, where the second virtual object is a first virtual object controlled by the terminal, or a first virtual object controlled by a player. The terminal displays the second target expression above the second target position at which the second virtual object is located, thereby achieving the effect that the second target expression is displayed above the virtual object controlled by the terminal.

In some embodiments, when the second virtual object moves in the virtual scene, the terminal adjusts the display position of the second target expression, so that the second target expression is always displayed above the second virtual object. By dragging the second target expression to the neighborhood of the second virtual object, the terminal displays the second target expression above the second virtual object, so that when the second virtual object moves in the virtual scene, the second target expression will move along the second virtual object, thereby achieving the effect that the second target expression is always kept above the second virtual object.

In some embodiments, in response to a selection operation on the second target expression in the plurality of first candidate expressions, the terminal controls the controlled virtual object to move to the second target position, and displays the second target expression at the second target position. The controlled virtual object is a virtual object controlled by a user login terminal. The controlling in the terminal controlling the controlled virtual object means displaying, and the control process is performed by a server. The terminal displays the process in which the controlled virtual object performs the action, or the controlled virtual object is directly controlled by the terminal to perform the action, which is not limited in this embodiment of this disclosure. Because when displaying the first target expression, the terminal can further control the controlled virtual object to move to the display position of the first target expression, to enrich the effects of displaying the first target expression.

In some embodiments, a plurality of user avatars are displayed in the virtual scene, and the terminal transmits, when a third target expression in the plurality of first candidate expressions is dragged to a position at which a target user avatar is located, the third target expression to a terminal corresponding to the target user avatar, the target user avatar being any one of the plurality of user avatars. Through this implementation, when sending an expression to a target user (which is a user corresponding to a target user avatar), it is only necessary to drag the third target expression in the first candidate expressions to the user avatar of the target user. Compared with the manner of first calling up a chat window, calling an expression selection panel in the chat window, selecting an expression in the expression selection panel, and then clicking a send control in the chat window to send the expression, the operations are simple and convenient, and the man-machine interaction efficiency is improved.

For example, when the third target expression is dragged to a position at which the target user avatar is located, the terminal sends the third target expression to a terminal corresponding to the target user avatar, that is, displays the third target expression in the chat box in the virtual scene and sends third target expression. A receiver of the third target expression is the terminal of the target user.

All the exemplary technical solutions may be combined to form exemplary embodiments of this disclosure in different manners.

By using the technical solutions provided in the embodiments of this disclosure, a user can trigger display of an expression selection region by dragging an expression addition icon, so that expression selection can be performed based on the expression selection region, and therefore, a selected first target expression is displayed at a first target position in a virtual scene. Because the first target position is a position at which the drag operation ends, a display position of the first target expression can be changed by adjusting the drag operation. The operations are simple and convenient, and the man-machine interaction efficiency is high. For example, when the user intends to send an expression in the virtual scene, by selecting, in the displayed expression selection region, the first target expression that the user intends to display, and then performing a drag operation on the expression, the expression can be sent. Compared with the manner of first calling up a chat window, calling an expression selection panel in the chat window, selecting an expression in the expression selection panel, and then clicking a send control in the chat window to send the expression, the operations are simple and convenient, and the man-machine interaction efficiency is improved.

Figure 13:
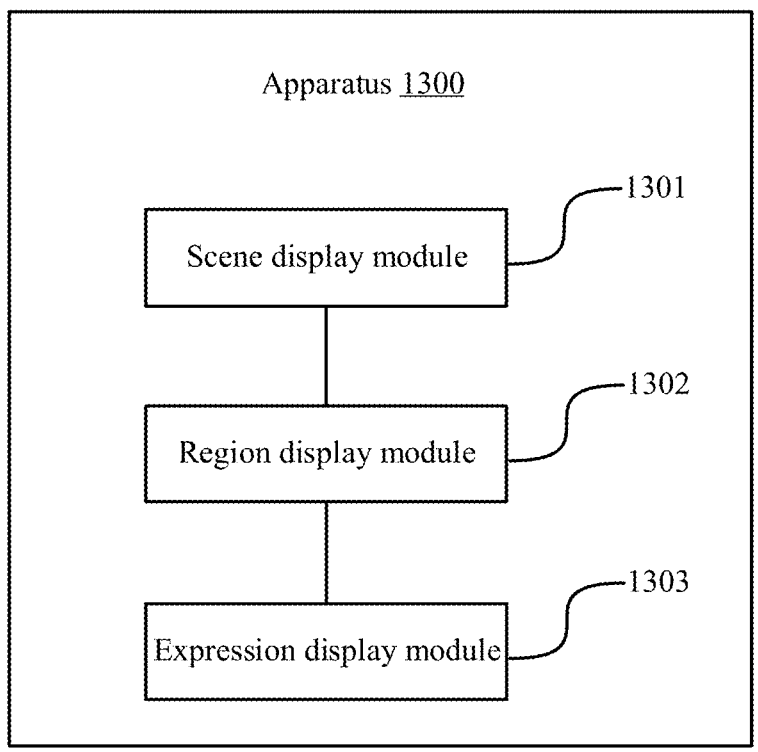
FIG. 13 is a schematic structural diagram of an apparatus for displaying an expression in a virtual scene according to an embodiment of this disclosure.

FIG. 13 is a schematic structural diagram of an apparatus 1300 for displaying an expression in a virtual scene according to an embodiment of this disclosure. Referring to FIG. 13, the apparatus 1300 includes: a scene display module 1301, a region display module 1302, and an expression display module 1303.

Herein, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The scene display module 1301 is configured to display a virtual scene, an expression addition icon being displayed in the virtual scene, the expression addition icon being used for adding an expression in the virtual scene.

The region display module 1302 is configured to display an expression selection region at a first target position in the virtual scene in response to a drag operation on the expression addition icon, the first target position being a position at which the drag operation ends, and a plurality of first candidate expressions being displayed in the expression selection region.

The expression display module 1303 is configured to display, in response to a selection operation on a first target expression in the plurality of first candidate expressions, the first target expression in the virtual scene.

In some embodiments, the expression display module 1303 is configured to display the first target expression at the first target position in the virtual scene in response to the selection operation on the first target expression in the plurality of first candidate expressions.

In some embodiments, a controlled virtual object is displayed in the virtual scene, and the expression display module 1303 is configured to control, in response to the selection operation on the first target expression in the plurality of first candidate expressions, the controlled virtual object to move to the first target position.

In some embodiments, the expression display module 1303 is configured to play an animation corresponding to the first target expression in the virtual scene in response to the selection operation on the first target expression in the plurality of first candidate expressions.

In some embodiments, the expression selection region includes a first subregion and a second subregion, the first subregion being configured for displaying type icons of expressions, one of the type icons being corresponding to a plurality of expressions; and the expression display module 1303 is configured to: display the first subregion and the second subregion at the first target position in the virtual scene; and display, in response to a selection operation on a first type icon in the first subregion, the plurality of first candidate expressions corresponding to the first type icon in the second subregion.

In some embodiments, the apparatus further includes:
an expression switching module, configured to switch, in response to a selection operation on a second type icon in the first subregion, the plurality of first candidate expressions displayed in the second subregion to a plurality of second candidate expressions, the second candidate expressions being expressions corresponding to the second type icon.

In some embodiments, the expression selection region includes a plurality of subregions, and the plurality of first candidate expressions are respectively displayed in the plurality of subregions.

In some embodiments, the expression selection region is a circular region, one of the subregions is one part of the circular region, and a type icon corresponding to the plurality of first candidate expressions is displayed in the center of the circular region.

In some embodiments, at least one first virtual object is displayed in the virtual scene, and the first candidate expressions are expressions corresponding to the first virtual object.

In some embodiments, the apparatus further includes:
- a control module, configured to control a target virtual object to perform an action corresponding to the first target expression, the target virtual object being a first virtual object corresponding to the first target expression in the at least one first virtual object.

The division of the above functional modules is only described for exemplary purposes when the apparatus for displaying an expression in a virtual scene provided in the foregoing embodiment displays an expression in a virtual scene. In actual application, the functions may be allocated to and completed by different functional modules according to specific needs, which means that the internal structure of the computer device is divided into different functional modules to complete all or some of the above described functions. In addition, the apparatus for displaying an expression in a virtual scene provided in the foregoing embodiment belongs to the same concept as the embodiments of the method for displaying an expression in a virtual scene. For a specific implementation process of the apparatus, reference may be made to the method embodiments.

By using the technical solutions provided in the embodiments of this disclosure, a user can trigger display of an expression selection region by dragging an expression addition icon, so that expression selection can be performed based on the expression selection region, and therefore, a selected first target expression is displayed at a first target position in a virtual scene. Because the first target position is a position at which the drag operation ends, a display position of the first target expression can be changed by adjusting the drag operation. The operations are simple and convenient, and the man-machine interaction efficiency is high. For example, when the user intends to send an expression in the virtual scene, by performing a drag operation on the expression addition icon and then selecting, in the displayed expression selection region, the first target expression that the user intends to display, the expression can be sent. Compared with the manner of first calling up a chat window, calling an expression selection panel in the chat window, selecting an expression in the expression selection panel, and then clicking a send control in the chat window to send the expression, the operations are simple and convenient, and the man-machine interaction efficiency is improved.

Figure 14:
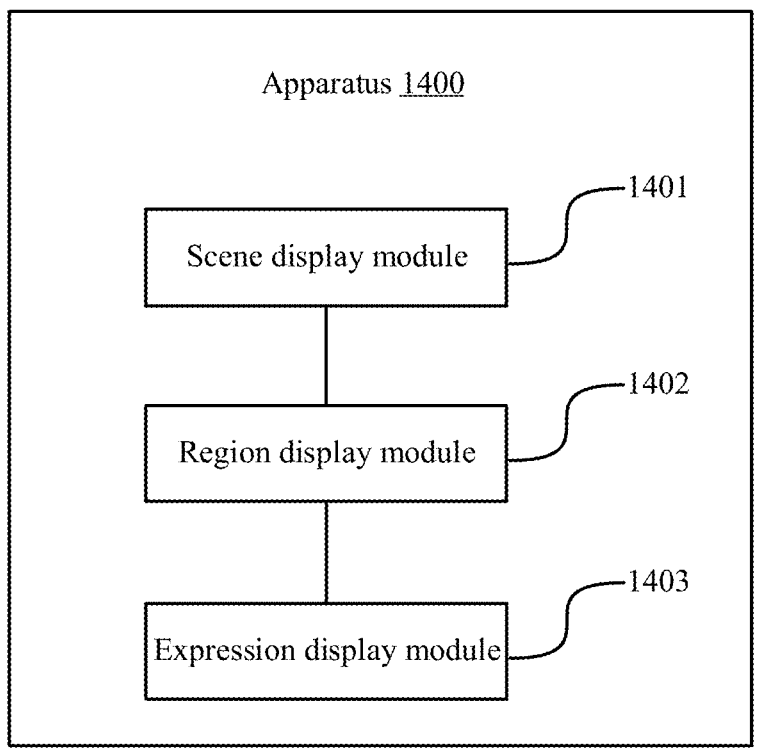
FIG. 14 is another schematic structural diagram of an apparatus for displaying an expression in a virtual scene according to an embodiment of this disclosure.

FIG. 14 is another schematic structural diagram of an apparatus 1400 for displaying an expression in a virtual scene according to an embodiment of this disclosure. Referring to FIG. 14, the apparatus 1400 includes: a scene display module 1401, a region display module 1402, and an expression display module 1403.

The scene display module 1401 is configured to display a virtual scene, an expression addition icon being displayed in the virtual scene, the expression addition icon being used for adding an expression in the virtual scene.

The region display module 1402 is configured to display an expression selection region in the virtual scene in response to a click operation on the expression addition icon, a plurality of first candidate expressions being displayed in the expression selection region.

The expression display module 1403 is configured to display, in response to a drag operation on a second target expression in the plurality of first candidate expressions, the second target expression at a second target position, the second target position being a position at which the drag operation ends.

In some embodiments, a plurality of first virtual objects are displayed in the virtual scene; and the expression display module 1403 is configured to perform either of the following:
- displaying, when the second target expression is dragged to a third target position and a distance between any one of the first virtual objects and the third target position meets a target condition, the second target expression at the second target position at which the any first virtual object is located; and
- displaying, when the second target expression is dragged to the third target position and distances between at least two of the first virtual objects and the third target position meet the target condition, the second target expression at the second target position at which a second virtual object is located, the second virtual object being a first virtual object controlled by the computer device in the at least two first virtual objects.

In some embodiments, a plurality of user avatars are displayed in the virtual scene; and the apparatus further includes:
- an expression transmission module, configured to transmit, when a third target expression in the plurality of first candidate expressions is dragged to a position at which a target user avatar is located, the third target expression to a terminal corresponding to the target user avatar, the target user avatar being any one of the plurality of user avatars.

The division of the above functional modules is only described for exemplary purposes when the apparatus for displaying an expression in a virtual scene provided in the foregoing embodiment displays an expression in a virtual scene. In actual application, the functions may be allocated to and completed by different functional modules according to specific needs, which means that the internal structure of the computer device is divided into different functional modules to complete all or some of the above described functions. In addition, the apparatus for displaying an expression in a virtual scene provided in the foregoing embodiment belongs to the same concept as the embodiments of the method for displaying an expression in a virtual scene. For a specific implementation process of the apparatus, reference may be made to the method embodiments.

By using the technical solutions provided in the embodiments of this disclosure, a user can trigger display of an expression selection region by dragging an expression addition icon, so that expression selection can be performed based on the expression selection region, and therefore, a selected first target expression is displayed at a first target position in a virtual scene. Because the first target position is a position at which the drag operation ends, a display position of the first target expression can be changed by adjusting the drag operation. The operations are simple and convenient, and the man-machine interaction efficiency is high. For example, when the user intends to send an expression in the virtual scene, by selecting, in the displayed expression selection region, the first target expression that the user intends to display, and then performing a drag operation on the expression, the expression can be sent. Compared with the manner of first calling up a chat window, calling an expression selection panel in the chat window, selecting an expression in the expression selection panel, and then clicking a send control in the chat window to send the expression, the operations are simple and convenient, and the man-machine interaction efficiency is improved.

Figure 15:
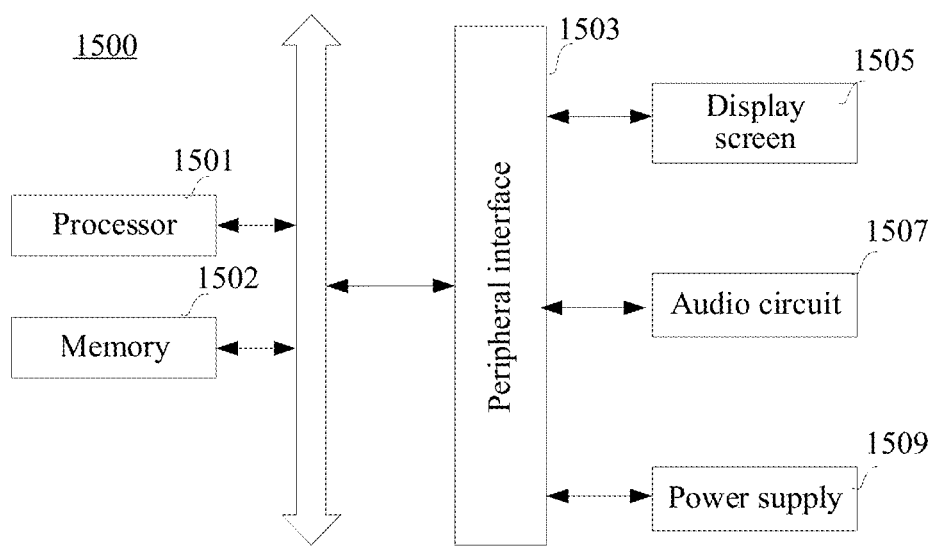
FIG. 15 is a schematic structural diagram of a terminal according to an embodiment of this disclosure.

An embodiment of this disclosure provides a computer device, configured to perform the foregoing method. The computer device may be implemented as a terminal, and a structure of the terminal is described below:

FIG. 15 is a schematic structural diagram of a terminal according to an embodiment of this disclosure. The terminal 1500 may be a smartphone, a tablet computer, a notebook computer, or a desktop computer. The terminal 1500 may also be referred to as user equipment, a portable terminal, a laptop terminal, a desktop terminal, or other names.

Generally, the terminal 1500 includes one or more processors 1501 and one or more memories 1502.

The processor 1501 may include one or more processing cores, and may be, for example, a 4-core processor or an 8-core processor. The processor 1501 may be implemented by using at least one hardware form of digital signal processor (DSP), a field-programmable gate array (FPGA), and a programmable logic array (PLA). The processor 1501 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 1501 may be integrated with a graphics processing unit (GPU). The GPU is configured to be responsible for rendering and drawing content that a display screen needs to display. In some embodiments, the processor 1501 may further include an AI processor. The AI processor is configured to process a computing operation related to machine learning.

The memory 1502 may include one or more computer-readable storage media. The computer-readable storage media may be non-transient. The memory 1502 may further include a high-speed random access memory (RAM), and a non-volatile memory such as one or more magnetic disk storage devices and a flash storage device. In some embodiments, the non-transitory computer-readable storage medium in the memory 1502 is configured to store at least one computer program, the at least one computer program being configured to be executed by the processor 1501 to implement the method for displaying an expression in a virtual scene provided in the method embodiments of this disclosure.

In some embodiments, the terminal 1500 may include: a peripheral interface 1503 and at least one peripheral. The processor 1501, the memory 1502, and the peripheral interface 1503 may be connected through a bus or a signal cable. Each peripheral may be connected to the peripheral interface 1503 through a bus, a signal cable, or a circuit board. Specifically, the peripheral includes: at least one of a display screen 1505, an audio circuit 1507, and a power supply 1509.

The peripheral interface 1503 may be configured to connect at least one input/output (I/O)-related peripheral to the processor 1501 and the memory 1502. In some embodiments, the processor 1501, the memory 1502 and the peripheral interface 1503 are integrated on a same chip or circuit board. In some other embodiments, any one or two of the processor 1501, the memory 1502, and the peripheral interface 1503 may be implemented on a single chip or circuit board. This is not limited in this embodiment.

The display screen 1505 is configured to display a user interface (UI). The UI may include a graphic, a text, an icon, a video, and any combination thereof. When the display screen 1505 is a touch display screen, the display screen 1505 further has a capability of acquiring a touch signal on or above a surface of the display screen 1505. The touch signal may be used as a control signal to be inputted into the processor 1501 for processing. In this case, the display screen 1505 may be further configured to provide a virtual button and/or a virtual keyboard that are/is also referred to as a soft button and/or a soft keyboard.

The audio circuit 1507 may include a microphone and a speaker. The microphone is configured to: acquire sound waves of a user and an environment, and convert the sound waves into electrical signals and input the electrical signals into the processor 1501 for processing.

The power supply 1509 is configured to supply power to components in the terminal 1500. The power supply 1509 may be an alternating current, a direct current, a primary battery, or a rechargeable battery.

A person skilled in the art may understand that the structure shown in FIG. 15 constitutes no limitation on the terminal 1500, and the terminal may include more or fewer components than those shown in the figure, or some components may be combined, or a different component deployment may be used.

In an embodiment of this disclosure, a computer-readable storage medium, for example, a memory including a computer program, is further provided, and the computer program may be executed by a processor to complete the method for displaying an expression in a virtual scene in the foregoing embodiments. For example, the computer-readable storage medium may be a read-only memory (ROM), a RAM, a compact disc ROM (CD-ROM), a magnetic tape, a floppy disk, an optical data storage device, or the like.

In an embodiment of this disclosure, a computer program product or computer program is further provided, the computer program product or computer program including program code, the program code being stored in a computer-readable storage medium. A processor of a computer device reads the program code from the computer-readable storage medium and executes the program code to cause the computer device to perform the method for displaying an expression in a virtual scene described above.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. A method for displaying an expression in a virtual scene, performed by a computer device, comprising:
    displaying a virtual scene, an expression addition control being displayed in the virtual scene, the expression addition control being for designating a position in the virtual scene for displaying an expression selection region, the expression selection region comprising a plurality of first candidate expressions;
    in response to a drag operation on the expression addition control in the virtual scene, determining a position in the virtual scene at which the drag operation ends as a first target position; and
    displaying the expression selection region at the first target position in the virtual scene, wherein the expression selection region is refrained from being displayed during the drag operation; and displaying, in response to a selection operation on a first target expression in the plurality of first candidate expressions, the first target expression in the virtual scene.

2. The method according to claim 1, wherein the displaying the first target expression in the virtual scene comprises:

displaying the first target expression at the first target position in the virtual scene in response to the selection operation on the first target expression in the plurality of first candidate expressions.

3. The method according to claim 1, wherein a controlled virtual object is displayed in the virtual scene, and the method further comprises:

controlling, in response to the selection operation on the first target expression in the plurality of first candidate expressions, the controlled virtual object to move to the first target position.

4. The method according to claim 1, wherein the displaying the first target expression in the virtual scene comprises:

playing an animation corresponding to the first target expression in the virtual scene in response to the selection operation on the first target expression in the plurality of first candidate expressions.

5. The method according to claim 1, wherein the expression selection region comprises a first subregion and a second subregion, the first subregion being configured to display type icons of expressions, one of the type icons being corresponding to a plurality of expressions; and the displaying the expression selection region at the first target position in the virtual scene comprises:

displaying the first subregion and the second subregion at the first target position in the virtual scene; and displaying, in response to a selection operation on a first type icon in the first subregion, the plurality of first candidate expressions corresponding to the first type icon in the second subregion.

6. The method according to claim 5, further comprising: switching, in response to a selection operation on a second type icon in the first subregion, the plurality of first candidate expressions displayed in the second subregion to a plurality of second candidate expressions, the second candidate expressions being expressions corresponding to the second type icon.

7. The method according to claim 1, wherein the expression selection region comprises a plurality of subregions, and the plurality of first candidate expressions are respectively displayed in the plurality of subregions.

8. The method according to claim 7, wherein the expression selection region is a circular region, one of the subregions is a portion of the circular region, and a type icon corresponding to the plurality of first candidate expressions is displayed in the center of the circular region.

9. The method according to claim 1, wherein at least one first virtual object is displayed in the virtual scene, and the first candidate expressions are expressions corresponding to the first virtual object.

10. The method according to claim 9, further comprising: controlling a target virtual object to perform an action corresponding to the first target expression, the target virtual object being a first virtual object corresponding to the first target expression in the at least one first virtual object.

11. A method for displaying an expression in a virtual scene, performed by a computer device, comprising:

displaying a virtual scene, an expression addition control being displayed in the virtual scene, the expression addition control being for adding an expression in the virtual scene;

displaying an expression selection region in the virtual scene in response to a click operation on the expression addition control, a plurality of first candidate expressions being displayed in the expression selection region; and in response to a drag operation on a second target expression in the plurality of first candidate expressions in the virtual scene and the drag operation ends, determining a position in the virtual scene at which the drag operation ends as a second target position, and displaying, the second target expression at the second target position in the virtual scene;

wherein a plurality of user avatars are displayed in the virtual scene, and the method further comprises:

in response to a third target expression in the plurality of first candidate expressions being dragged to a position at which a target user avatar is located, transmitting the third target expression to another computer device corresponding to the target user avatar, the target user avatar being one of the plurality of user avatars.

12. The method according to claim 11, wherein a plurality of first virtual objects are displayed in the virtual scene, and the displaying the second target expression at the second target position comprises:

displaying, in response to the second target expression being dragged to a third target position and a distance between one of the first virtual objects and the third target position meeting a target condition, the second target expression at the second target position at which the one of the first virtual objects is located.

13. The method according to claim 11, wherein a plurality of first virtual objects are displayed in the virtual scene, and the displaying the second target expression at the second target position comprises:

displaying, in response to the second target expression being dragged to a third target position and a distance between at least two of the first virtual objects and the third target position meet the target condition, the second target expression at the second target position at which a second virtual object is located, the second virtual object being a first virtual object in the at least two first virtual objects.

14. An apparatus for displaying an expression in a virtual scene, comprising:

a memory operable to store computer-readable instructions; and a processor circuitry operable to read the computer-readable instructions, the processor circuitry when executing the computer-readable instructions is configured to:

display a virtual scene, an expression addition control being displayed in the virtual scene, the expression addition control being for designating a position in the virtual scene for displaying an expression selection region, the expression selection region comprising a plurality of first candidate expressions;

in response to a drag operation on the expression addition control in the virtual scene, determine a position in the virtual scene at which the drag operation ends as a first target position; and display the expression selection region at the first target position in the virtual scene, the expression selection region is refrained from being displayed during the drag operation;

display, in response to a selection operation on a first target expression in the plurality of first candidate expressions, the first target expression in the virtual scene.

15. The apparatus according to claim 14, wherein the processor circuitry is configured to:

display the first target expression at the first target position in the virtual scene in response to the selection operation on the first target expression in the plurality of first candidate expressions.

16. The apparatus according to claim 14, wherein a controlled virtual object is displayed in the virtual scene, and the processor circuitry is further configured to:

control, in response to the selection operation on the first target expression in the plurality of first candidate expressions, the controlled virtual object to move to the first target position.

17. The apparatus according to claim 14, wherein the processor circuitry is configured to:

play an animation corresponding to the first target expression in the virtual scene in response to the selection operation on the first target expression in the plurality of first candidate expressions.

18. The apparatus according to claim 14, wherein the expression selection region comprises a first subregion and a second subregion, the first subregion being configured to display type icons of expressions, one of the type icons being corresponding to a plurality of expressions, and the processor circuitry is configured to:

display the first subregion and the second subregion at the first target position in the virtual scene; and display, in response to a selection operation on a first type icon in the first subregion, the plurality of first candidate expressions corresponding to the first type icon in the second subregion.

19. The apparatus according to claim 14, wherein the expression selection region comprises a plurality of subregions, and the plurality of first candidate expressions are respectively displayed in the plurality of subregions.

* * * * *